April 11, 1944.  C. A. BREWER  2,346,355
CONTROL SYSTEM FOR MOTOR VEHICLES
Original Filed Oct. 2, 1929
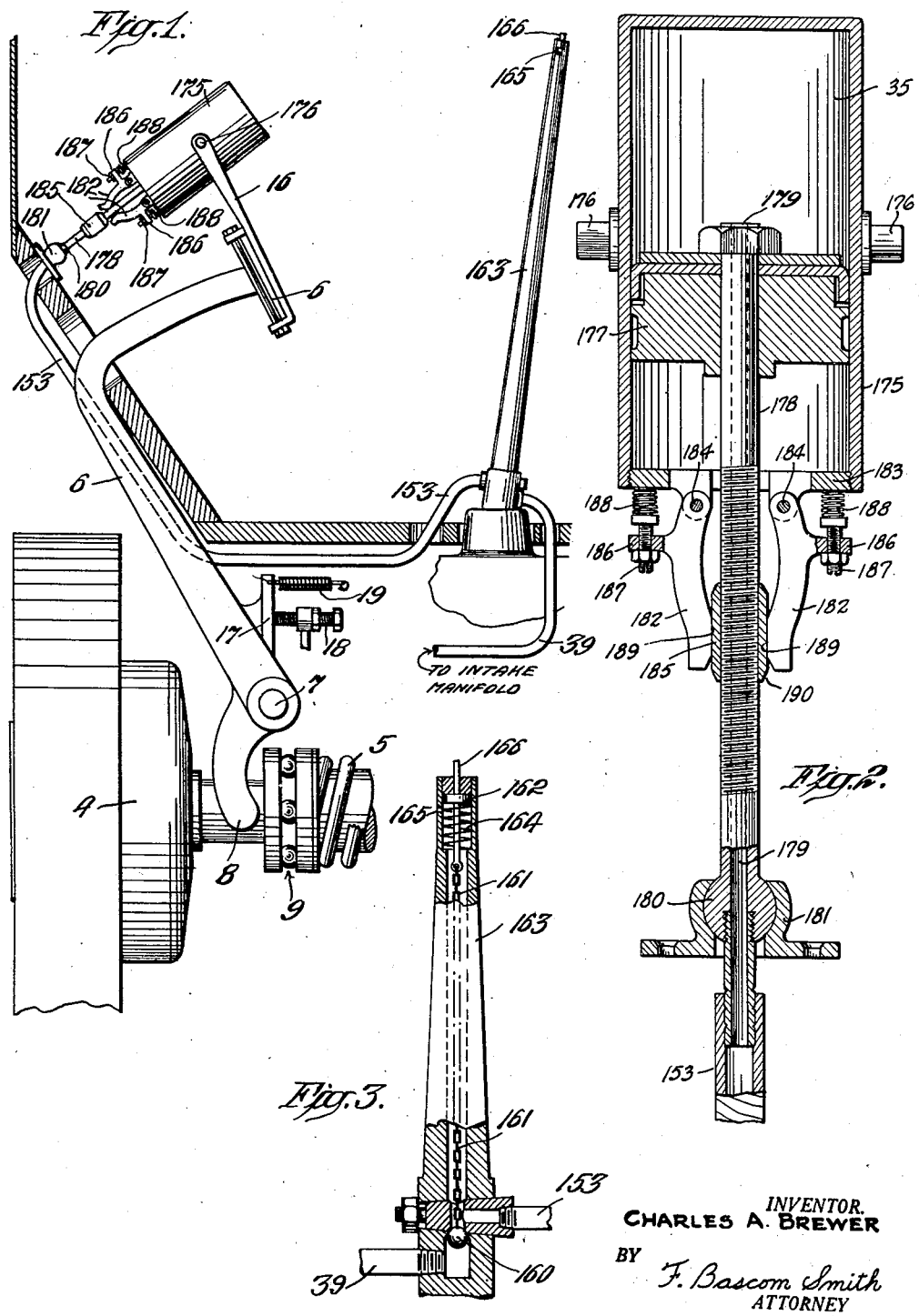
INVENTOR.
CHARLES A. BREWER
BY
F. Bascom Smith
ATTORNEY Patented Apr. 11, 1944

2,346,355

UNITED STATES PATENT OFFICE 2,346,355

CONTROL SYSTEM FOR MOTOR VEHICLES

Charles A. Brewer, Noroton Heights, Conn., assignor of one-half to Philip J. Kury, Arverne, N. Y.

Original application October 2, 1929, Serial No. 396,691. Divided and this application January 17, 1944, Serial No. 518,652

9 Claims. (Cl. 192—.01)

This invention relates to motor vehicles, and more particularly to a safety control system for controlling the operation of a motor vehicle to reduce a large number of accidents, provide safety in operation and a more uniform and easier control of the vehicle than is now possible with the ordinary constructions.

This application is a division of my copending application Serial No. 396,691 for "Safety control system for motor vehicles," filed October 2, 1929, and all subject matter contained in said copending application which is applicable to the disclosure thereof that corresponds with the disclosure of the present application is made a part hereof by reference.

It is a particular object of the invention to provide an improved operating and control means for a clutch, to reduce wear on the vehicle and the various operating mechanisms thereof, and also to tend to smooth out the operation and control of the vehicle to reduce starting strains and fatigue to the passengers.

Another object is to provide a novel simplified form of apparatus for disengaging the clutch of a motor vehicle or the like and for automatically controlling the engaging movement thereof.

Still another object is to provide power operated apparatus adapted to disengage a clutch and means novelly associated with said apparatus for controlling the engagement of the clutch.

A further object is to provide novel means for frictionally controlling the engaging movement of a clutch of a motor vehicle or the like.

The above and further objects and novel features of this invention will more fully appear from the following detailed description taken in connection with the accompanying drawing. It is to be expressly understood, however, that the drawing is for the purpose of illustration only and is not designed as a definition of the limits of the invention, reference being primarily had for this latter purpose to the appended claims.

In the drawing, wherein like reference characters refer to like parts throughout the several views, Fig. 1 is a somewhat diagrammatic side elevation, partly in section and with parts broken away, showing one form of clutch operating power device embodying the present invention mounted on a motor vehicle;

Fig. 2 is an enlarged side elevation, partly in section and with parts broken away, showing the power device of Fig. 1; and, Fig. 3 is a detail view, partly in section and with parts broken away, showing one form of gear shift lever and control valve adapted for use in the structure of Fig. 1.

One form of clutch operating mechanism which may be employed in carrying out the present invention is illustrated in Figs. 1 to 3, inclusive, wherein the clutch 4 of a motor vehicle, normally held in operative engaged position by a spring 5, is adapted to be moved to disengaged position by the depression of a clutch pedal 6 of the type ordinarily provided for manual actuation of the clutch mechanism. Pedal 6 is pivotally mounted at 7 and is provided with a bifurcated portion 8 which is adapted to engage a bearing 9 for disengaging the clutch mechanism. The clutch pedal may be provided with a stop lug 17 to cooperate with an adjustable stop screw 18 to limit upward movement of the pedal under the action of a spring 19. This construction provides the necessary clearance between portion 8 of the clutch pedal and bearing 9 to prevent undue wear of this bearing and to insure complete engagement of the elements of clutch 4. A power device of the fluid pressure vacuum actuated type is provided for operating the clutch mechanism, said device being preferably attached directly to clutch pedal 6.

The power device comprises two relatively movable elements, in the present case, a piston element 177 and a cylinder 175 enclosing the piston, either of which may be movable relative to the other. In the particular embodiment shown, the piston represents the stationary element and the cylinder is moved relative thereto in a manner and for a purpose to appear hereafter. A bracket 181 is mounted on the foot board of the vehicle adjacent clutch pedal 6 for supporting the power device. The cylinder 175 is connected to clutch pedal 6 by means of trunnions 176 and a bracket 16. Piston 177 is slidable within cylinder 175 and has a hollow stem 178 connected thereto. The lower end of said stem is provided with a ball-like portion 180, which engages a suitable socket in bracket 181 to form a ball and socket joint, which permits a swinging movement of the power device to correspond with the movements of clutch pedal 6.

The central passage 179 in piston rod 178 communicates at its inner end with the expansible chamber 35 formed by cylinder 175 and piston 177. The other end of said passage and, hence, chamber 35 may be connected to a suitable source of suction, such as the intake manifold of the vehicle engine (not shown) or to atmosphere by flexible tube 153.

The conduit or connection 153 leading to the intake manifold and atmosphere may be controlled by any suitable valve means which may be either hand or power operated for alternately connecting chamber 35 of the power device to atmosphere and the source of suction. In the form shown, the communication of conduit 153 with the intake manifold or other source of suction is controlled by a manually operable valve 160 attached to a suitable cable or chain 161, which is in turn connected to a block 162 in a hollow lever 163, which may be the emergency brake lever or the gear shift lever of the vehicle. Block 162 and valve 160 are normally held in their uppermost positions, that is, with valve 160 against its seat, to close off communication of conduit 153 with the source of suction by means of a spring 164. In this position, the block 162 is above an opening 165, which connects the hollow lever 163 and, hence, chamber 35 with the atmosphere.

In the arrangement thus described, if the operator wishes to release, i. e., disengage, the clutch, he can press downwardly on the projection or thumb button 166 to thereby permit valve 160 to open and to move the block or piston 162 across the opening 165. This will cut off communication of chamber 35 in the power device with the atmosphere and will place it in communication with the intake manifold or other source of suction through a connection 39. The air will, therefore, be drawn out of chamber 35 and the external pressure acting on cylinder 175 will force the same downwardly relative to piston 177. Through the bracket connection 16, clutch pedal 6 is moved downwardly with cylinder 175 to thereby disengage clutch 4.

Means are provided in novel combination with the above described clutch operating power device for automatically controlling the engagement of the clutch in such a manner as to simulate expert manual operation of the clutch. In the form shown, the automatic control of clutch engagement is accomplished by means of spring pressed friction levers 182, which are pivoted at 184 to the head 183 in cylinder 175 and are adapted to cooperate with the cam block 185 which is adjustably mounted on piston rod or stem 178. Block 185 is in the form of a spool or sleeve threaded onto a central portion of rod 178 for adjustment longitudinally of the latter. The outer surface of cam block 185 may be of any suitable shape that may be found proper to give the desired control of the clutch engaging movement.

Levers 182, of which there may be one or many, have lugs 186 thereon in which are mounted adjusting screws 187 for adjusting the compression of suitable resilient means, such as springs 188. These springs tend to force the contact surfaces 189 of levers 182 against the surface of cam block 185 and thereby provide a frictional resistance to the movement of cylinder 175 relative to piston 177.

Thus, when chamber 35 is placed in communication with the source of suction by operation of the valve device heretofore described, cylinder 175 is moved downwardly to thereby disengage or release the clutch. This brings arms 182 below cam block 185. When the valve mechanism is released and permitted to operate to cut off communication between chamber 35 and the source of suction and to place said chamber in communication with the atmosphere through port 165, the pressures within and without chamber 35 tend to equalize so that cylinder 175 immediately starts to move upwardly under the action of springs 5 and 19. The first part of this movement is a rapid one and preferably continues until about the time the driving surfaces of clutch 4 begin to engage. Cam block 185 is so adjusted on rod 178 that at this time the levers 182 begin to ride up on the inclined surface 190 of said block. This offers an increased resistance to the upward movement of the cylinder 175 and, hence, to the engaging movement of the clutch by reason of the friction of levers 182 on the cam block, which resistance may be varied by adjusting the initial compression of springs 188 by means of screws 187. The action of said levers and cam block accordingly automatically slows up movement of the power device cylinder and the clutch surfaces during the clutch engaging movement and while the car is starting and picking up speed. A variable rate of movements may be secured by means of lugs or ribs, that is, an irregular surface on the cam block 185 for suitable cooperation with the engaging surfaces 189 of levers 182.

After the clutch surfaces have become fully engaged and the car is started, arms 182 slide off of cam block 185 to thereby permit free and unrestricted movement of the cylinder and the clutch parts during the remaining movement of the clutch pedal. Cam block 185 is preferably adjusted so that the arms 182 engage it just before the pedal reaches the point at which the clutch surfaces engage one another and so that said arms leave the cam block when the clutch pedal reaches a point at which the clutch surfaces are fully engaged.

Although only a single embodiment of the invention has been illustrated and described, it is to be expressly understood that the same is not limited thereto but that various changes may be made in the mechanical details as well as in the design and arrangement of parts illustrated without departing from the spirit and scope of the invention as the same will now be understood by those skilled in the art. Reference will, therefore, be had primarily to the appended claims for a definition of the limits of the invention.

What is claimed is:

1. In a clutch control device for motor vehicles, a power device connected to the clutch and capable of releasing it, a control device for the power device to cause it to function to release the clutch, and control means for said power device including friction means for varying the resistance of the power device to the engaging movement of the clutch.

2. Apparatus of the character described comprising a power device operatively connected to a motor vehicle clutch, a control device for effecting actuation of said power device to disengage the clutch and to release the clutch elements for return movement toward engaged position, and friction means operative when the clutch elements reach an intermediate position for retarding the engaging movement of the clutch elements.

3. In a clutch control device for motor vehicles including a spring tending to cause engagement of the clutch, means for automatically controlling the engaging movement of the clutch comprising a pair of relatively movable members, means for connecting one of said members with the clutch, and friction means associated with said relatively movable members and operative for retarding relative movement thereof when the elements of the clutch reach an intermediate position during the engaging movement thereof.

4. In a clutch control device for motor vehicles, a suction power device comprising two relatively movable elements, means connecting one of said elements to the clutch, means connecting said device to a source of suction and to atmosphere, means for controlling said last-named connecting means to cause the power device to function to disengage the clutch and to release the clutch elements for return movement to engaged position, and cooperable means on said relatively movable elements for frictionally retarding the engaging movement of the clutch at a predetermined point during said movement.

5. In apparatus of the class described, power means comprising two relatively movable elements, one of said elements being connected to the clutch of a motor vehicle, control means for the power means to cause the latter to function to disengage the clutch and release the same for movement to engaged position, and cooperable means on said relatively movable elements for frictionally retarding the engaging movement of the clutch at an intermediate point during said movement, such as a point just prior to the point at which the clutch driving surfaces engage each other.

6. In apparatus of the character described, a power device comprising two relatively movable parts, means connecting one of said parts to a motor vehicle clutch, control means for effecting actuation of said power device to disengage the clutch and release the clutch elements for return movement toward engaged position, and friction means operative when the clutch elements reach an intermediate position for retarding the engaging movement of the clutch elements, said friction means including a lever pivotally mounted on one of said elements and resilient means for pressing said lever into frictional engagement with means on the other of said elements during a part only of the clutch engaging movement.

7. In a clutch control device for motor vehicles including means tending to cause engagement of the clutch, means for automatically controlling the engaging movement of the clutch comprising two relatively movable parts, means for connecting one of said parts to the clutch, and friction means associated with said relatively movable parts and operative for retarding relative movement thereof when the elements of the clutch reach an intermediate position during the engaging movement thereof, said friction means including a lever pivotally mounted on one of said parts, means on said other part for frictionally engaging said lever and resilient means for pressing said lever into frictional engagement with said last-named means.

8. In a clutch control device for motor vehicles, means for automatically controlling the engaging movement of the clutch comprising a pair of relatively movable members, means for connecting one of said members with the clutch, friction means including resilient means for resisting the engaging movement of the clutch, and means associated with said relatively movable members for varying the effective pressure of said resilient means to increase the resistance offered by said friction means and retard the movement of the clutch at an intermediate point during the engaging movement thereof.

9. In a control device for the clutch of a motor vehicle, two relatively movable parts, means for connecting one of said parts with the clutch, and friction means for automatically retarding the relative movement of said parts and the engaging movement of the clutch when the elements of the clutch reach an intermediate position during the engaging movement thereof, said friction means including resilient means for pressing a surface on one of said parts into frictional engagement with a surface on the other of said parts during at least a part of the engaging movement of the clutch, and means for varying the effective pressure exerted by said resilient means in accordance with the relative movement of said parts.

CHARLES A. BREWER.